US012675654B2

(12) United States Patent  
Klicpera et al.

(10) Patent No.: US 12,675,654 B2  
(45) Date of Patent: *Jul. 7, 2026

(54) ENERGY STORAGE DEVICE AND A SYSTEM HAVING THE SAME

(71) Applicant: ZEBRA TECHNOLOGIES CORPORATION, Lincolnshire, IL (US)

(72) Inventors: Christopher P. Klicpera, Westbury, NY (US); Damien Ramrattan, Coram, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,756

(22) Filed: May 29, 2024

(65) Prior Publication Data

US 2024/0311589 A1     Sep. 19, 2024

Related U.S. Application Data

(63) Continuation of application No. 18/113,711, filed on Feb. 24, 2023, now Pat. No. 12,026,574.

(51) Int. Cl.  
*G06K 7/10* (2006.01)  
*G06K 7/14* (2006.01)  
*H01Q 1/22* (2006.01)  
*H02J 7/60* (2026.01)  
*H02J 7/70* (2026.01)  
*H02J 7/80* (2026.01)  
*H02J 50/80* (2016.01)

(52) U.S. Cl.  
CPC ....... *G06K 7/10297* (2013.01); *G06K 7/1413* (2013.01); *G06K 7/1417* (2013.01); *H01Q 1/2216* (2013.01); *H02J 7/60* (2026.01); *H02J 7/70* (2026.01); *H02J 7/80* (2026.01); *H02J 50/80* (2016.02)

(58) Field of Classification Search  
CPC ............ G06K 7/10297; G06K 7/1413; H01Q 1/2216; H02J 50/80  
USPC ........................................ 235/451  
See application file for complete search history.

(56) References Cited

U.S. PATENT DOCUMENTS 12,026,574 B1 *   7/2024   Klicpera ............... H02J 7/0042

* cited by examiner

*Primary Examiner* — Ahshik Kim

(57) ABSTRACT

An energy storage device and a system having the same are provided. The energy storage device includes a power unit, a gauge, an antenna, and a bridge electrically coupled to the antenna. The bridge is configured to receive information from the gauge and transmit the information through the antenna to an external device.

14 Claims, 3 Drawing Sheets

200

201

203

ENERGY STORAGE DEVICE AND A SYSTEM HAVING THE SAME

CROSS-REFERENCE TO RELATED APPLICATIONS

This disclosure is a continuation of U.S. patent application Ser. No. 18/113,711, filed on Feb. 24, 2023, and incorporated herein by reference in its entirety.

BACKGROUND

Over the past few decades, the use of cordless code symbol readers, such as barcode scanners and QR code scanners, has dramatically increased. Businesses have particularly been attracted by the cordless code symbol readers in the inventory management and point-of-sale contexts. The cordless code symbol readers are generally powered by energy storage devices such as battery packs. To determine the health and charge status of these energy storage devices, they need to be physically installed into the cordless code symbol readers which may be labor intensive when there are large collections of new or old energy storage devices such as battery packs. To improve the efficiency of the process of sorting and managing the energy storage devices, there exists a desire to develop new energy storage devices that are cost friendly and can particularly help streamline the process of monitoring the health and charge status of these energy storage devices.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
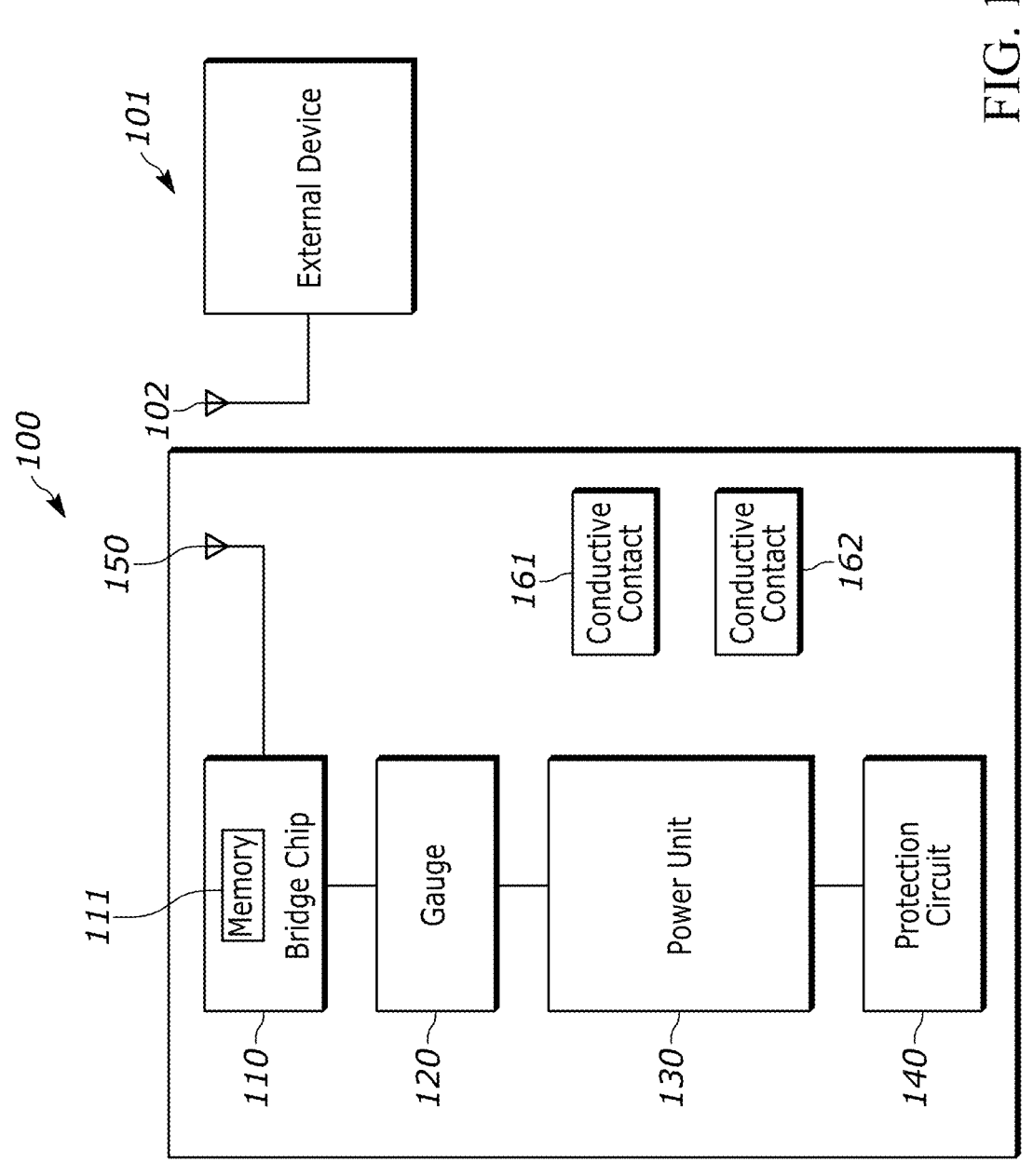
FIG. 1 is a diagram of an energy storage device and an external device according to an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Present day code symbol scanning is ubiquitous for stock control, and is used in shops and supermarkets, as well as in warehouses and in offices. The use of cordless code symbol readers, such as barcode scanners and QR code scanners, has dramatically increased.

The cordless barcode scanners and QR code scanners are electronic devices for reading the barcodes or QR codes. These cordless scanners are generally powered by energy storage devices such as battery or supercapacitor packs. The cordless scanners can obtain information from the energy storage devices and determine the health and charge status of the energy storage devices when they are physically installed into the cordless scanners.

Many different challenges arise in relation to the cordless scanners. For example, currently there is no way for the cordless scanners to check and determine the health and charge status of the energy storage devices such as battery or supercapacitor packs when they are not physically installed into the cordless scanners. It is not uncommon for customers or inventory managers to have a large amount of collections of random new and old spare battery or supercapacitor packs. It would be labor intensive and difficult to monitor and manage these packs because it requires each pack to be physically installed into the cordless scanners or other charging device.

In order to solve the technical problems described above, the present disclosure provides an energy storage device that is cost friendly and can particularly help streamline the process of monitoring, sorting and managing the health and charge status of the energy storage.

According to an embodiment of the present disclosure, an energy storage device is provided which includes a power unit, a gauge, an antenna, and a bridge chip that is electrically coupled to the antenna. The bridge chip is configured to receive information from the gauge which monitors the power unit and transmit the information through the antenna to an external device.

In another embodiment, the present disclosure provides a system including an electronic device and an energy storage device. The energy storage device further includes a power unit, a gauge, an antenna, and a bridge chip that is electrically coupled to the antenna. The bridge chip is configured to receive information from the gauge and transmit the information through the antenna to an external device.

The embodiments are described more fully herein after with reference to the accompanying drawings, in which some, but not all embodiments of the present technology are shown. Indeed, the present technology may be embodied in many different forms and should not be construed as limited to the embodiments set forth herein.

Likewise, many modifications and other embodiments of the energy storage device and the system described herein will come to mind to one of skill in the art to which the invention pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in an embodiment" as used herein does not necessarily refer to the same embodiment or implementation and the phrase "in another embodiment" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context. In addition, the terms "about," "around" "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

The terminology used herein is for the purpose of describing particular exemplary embodiments only and is not intended to be limiting. The terms "comprise", "comprises", "comprised" or "comprising", "including" or "having" and the like in the present specification and claims are used in an inclusive sense, that is to specify the presence of the stated features but not preclude the presence of additional or further features.

When an element, component or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

FIG. 1 illustrates an energy storage device 100 and an external device 101 according to an embodiment of the present disclosure. The energy storage device 100 may include a bridge chip 110, a gauge 120, a power unit 130, a protection circuit 140, and an antenna 150. The bridge chip 110 is a chip having a circuitry with an I²C interface that allows the chip to connect and communicate with a host (e.g., microcontroller (MCU) or microprocessor (MPU)) through the I²C interface. The bridge chip 110 is also electrically coupled to the antenna 150 and support wireless communication with the external device 101 through the antenna 150. The wireless communication may include, but not limited to, Near-field communication (NFC), Bluetooth, Wi-Fi (Wireless Fidelity), Zigbee, Z-Wave, RFID (Radio-frequency identification), 5G or the like. The antenna 150 may include a coil configured to perform NFC transmission according to an embodiment. The bridge chip 110 further includes a memory 111. The memory 111 may be a non-volatile memory such as EEPROM, read-only memory (ROM) or the like. The memory 111 may also include a 2048 bytes user memory and a 256 bytes SRAM. The memory 111 can be used to store information from the gauge 120. As a non-limiting example, the bridge chip 110 may be an NFC forum compliant I²C bridge chip in an embodiment. The NFC forum compliant I²C bridge chip has an NFC interface that can communicate with other NFC-enabled device at certain range. The NFC forum compliant I²C bridge chip also has a wired host interface that is configurable as an I²C controller/target, a Pulse Width Modulator (PWM), or a General-Purpose I/O (GPIO). The bridge chip 110 has an energy harvesting feature that allows the bridge chip 110 to be powered by energy from the external device through the antenna 150.

As illustrated in FIG. 1, a gauge 120 is provided to the energy storage device 100. The gauge 120 includes a circuitry that is configured to actively measure characteristics and/or parameters such as voltage, current, temperature and humidity of the power unit 130. The gauge 120 may automatically use the measured information to calculate and report information of the power unit 130 or calculate and report information of the power unit 130 in response to the request of the bridge chip 110. The gauge 120 may also include a memory to store the information of the power unit 130. The memory may include a non-volatile memory such as EEPROM, read-only memory (ROM) or the like, and/or a volatile memory such as random access memory (RAM) or the like. The information of the power unit 130 stored in the gauge 120 may include State of Charge (SoC), State of Health, cycle count, manufacture date, time in service, serial number, design capacity, voltage, current, protection status, firmware version, and temperature information. The gauge 120 is powered by the power unit 130 in an embodiment. However, the gauge 120 can also be powered by the bridge chip 110 in another embodiment. The gauge 120 is separate from the bridge chip 110 as illustrated in FIG. 1. However, the gauge 120 can be integrated with the bridge chip 110 as one piece or one module in another embodiment.

The power unit 130 includes, for example, one or more secondary battery cells and/or one or more supercapacitors. The secondary battery cell is, for example, a rechargeable secondary battery such as a lithium ion secondary battery, a lithium polymer secondary battery, a nickel-metal-hydride secondary battery or a nickel-cadmium secondary battery. The supercapacitor may have high specific capacity and energy density to store electric power and serve as a power source.

In an embodiment, the power unit 130 may also include a battery control circuit for controlling charge and discharge of the battery cells or supercapacitors. The power unit 130 can supply electric power to the bridge chip 110, the gauge 120 and the protection circuit 140 when needed. The power unit 130 can also serve as power source to provide electric power to an electronic device such as a QR code scanner and/or a barcode scanner. The energy storage device 100 may also include conductive contacts 161, 162 that are configured to receive a charge from a charging station or a charging device when the energy storage device 100 is attached or coupled or connected to the charging station or the charging device at the time of charging. One of the conductive contacts 161, 162 is for positive polarity, and the other one is for negative polarity. The energy storage device 100 may further include one or more additional conductive contacts to couple communication bus line(s) from the gauge 120 to a host device powered by the energy storage device 100. The energy storage device 100 may further includes one or more lights such as LEDs to indicate the charging status of the power unit 130. For example, the lights may show red color when the power unit 130 is under charging. The lights may change to green color when the power unit 130 is fully charged.

The energy storage device 100 further includes a protection circuit 140. The protection circuit 140 monitors the voltage or current of the power unit 130. In the case of overcharging or excessive discharge current, such the secondary battery cell inside the power unit 130 might have characteristics thereof such as cycle life degraded or might undergo expansion, deformation and the like. Accordingly, the energy storage device is provided with the protection circuit 140 for protecting the power unit 130 from overcharging or excessive discharge current.

The external device 101 as illustrated in FIG. 1 can be used to communicate with the energy storage device 100 via wireless communication. The external device 101, for example, may be a mobile phone, a tablet, a portable computer, a scanner or a reader/writer. The external device 101 is equipped with an antenna 102.

As a non-limiting example, the external device 101 may be a mobile phone with NFC communication capacity. The energy storage device 100 includes an NFC forum compliant I²C bridge chip that can communicate with the external device 101 through NFC wireless communication. When the mobile phone detects the energy storage device 100, an application running on the mobile phone can send a request to read out the information from the power unit over the NFC antenna in the external device 101. The NFC forum compliant I²C bridge chip of the energy storage device 100 may receive the request through its NFC antenna 150, and collect the information of the power unit from the gauge 120 and transmit the collected information to the external device 101 through NFC communication. In the case that the information of the power unit has been periodically collected, updated and stored in the memory 111 of the bridge chip 110, the bridge chip 110 may directly transmit the information of the power unit stored in its memory to the mobile phone through its NFC antenna 150 in a fast transfer mode. In the case that there is no information of the power unit stored in either the bridge chip 110 or the gauge 120, the NFC forum compliant I²C bridge chip may pass the request of the power unit information to the gauge 120, and then the gauge 120 may actively measure and/or determine the power unit information and provide such information in response to the request of NFC forum compliant I²C bridge chip. The information of the power unit may include State of Charge (SoC), State of Health, cycle count, manufacture date, time in service, serial number, design capacity, voltage, current, protection status, firmware version, temperature information and/or the like.

As a result, the mobile phone may access the gauge via NFC forum compliant I²C bridge chip and obtain the information of the power unit without the need of physically installing the energy storage device to an electronic device such as a barcode scanner. The application running on the mobile phone or any other desirable terminal devices can be customized to provide simple pass or fail feedback based on acceptable thresholds for fast and simple sorting of the energy storage device. For example, when the State of Health is equal to or less than 70%, the application will indicate a fail feedback to the user. When the State of Health is higher than 70%, the application will indicate a pass feedback to the user. However, the acceptable thresholds such as the State of Health is not limited to 70%, it can be further adjusted or modified per the user's desire and/or under suitable circumstances. In addition, the energy storage device as described herein can be further leveraged to reduce the number of physical contacts between the energy storage device and the electronic device such as a barcode scanner, which may advantageously reduce physical wear and tear on the scanners and the energy storage devices and streamline the labor intensive process of sorting and managing these energy storage devices.

According to at least one embodiment of the present disclosure, the energy storage device allows the user to tap to manage the power unit and has a great advantage to improve the efficiency and effectiveness of the process of monitoring, sorting and/or managing the health and charge status of the power units.

Figure 2:
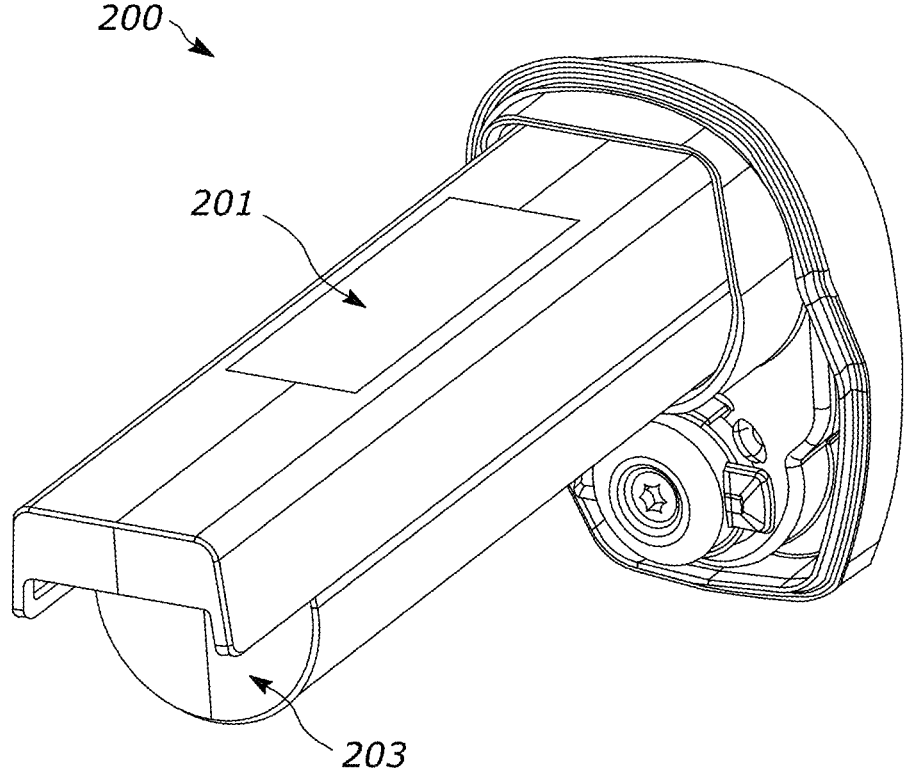
FIG. 2 is a configuration example of an energy storage device according to an embodiment of the present disclosure.

FIG. 2 illustrates an exemplary configuration of an energy storage device according to an embodiment of the present disclosure. The energy storage device 200 has a housing 203. The housing 203 accommodates a power unit, a protection circuit, a gauge, and a bridge chip. An antenna 201 is provided on the housing 203 of the energy storage device 200. The antenna 201 may has a rectangular shape, a square shape, a circular shape or any other suitable shape. The position of the antenna 201 is not limited to the specific place as illustrated in FIG. 2. The antenna 201 may also be provided on a side surface of the housing 203, or may be provided inside the housing 203 in different embodiments. The antenna 201 is electrically coupled with the bridge chip and allows the energy storage device 200 establish links with other devices using various wireless protocols. The antenna 201 can be configured to service multiple frequency bands to include NFC (Near Field Communication), FM, TV, GPS, and/or Bluetooth/WiFi. As a non-limiting example, the antenna 201 may be an NFC antenna that includes an inductive coil. The NFC antenna is configured to perform wireless communication with other NFC compatible devices such as NFC phones and readers. NFC protocols enable these devices to establish radio frequency communications by bringing the devices into close proximity to each other. The 13.56 MHz frequency band is commonly used for NFC. The bridge chip inside the housing 203 of the energy storage device can be powered by the coupled signal from an NFC reader, and the bridge chip can then be commanded to transmit information of the gauge back to the NFC reader using the inductive coupled link to complete the transaction. The information from the gauge may include State of Charge (SoC), State of Health, cycle count, manufacture date, time in service, serial number, design capacity, voltage, current, protection status, firmware version, and temperature information associated with the power unit. However, the information from the gauge is not limited to the specific information as described herein, and it may include any other desirable information that may help the users to identify and manage these power units.

Figure 3:
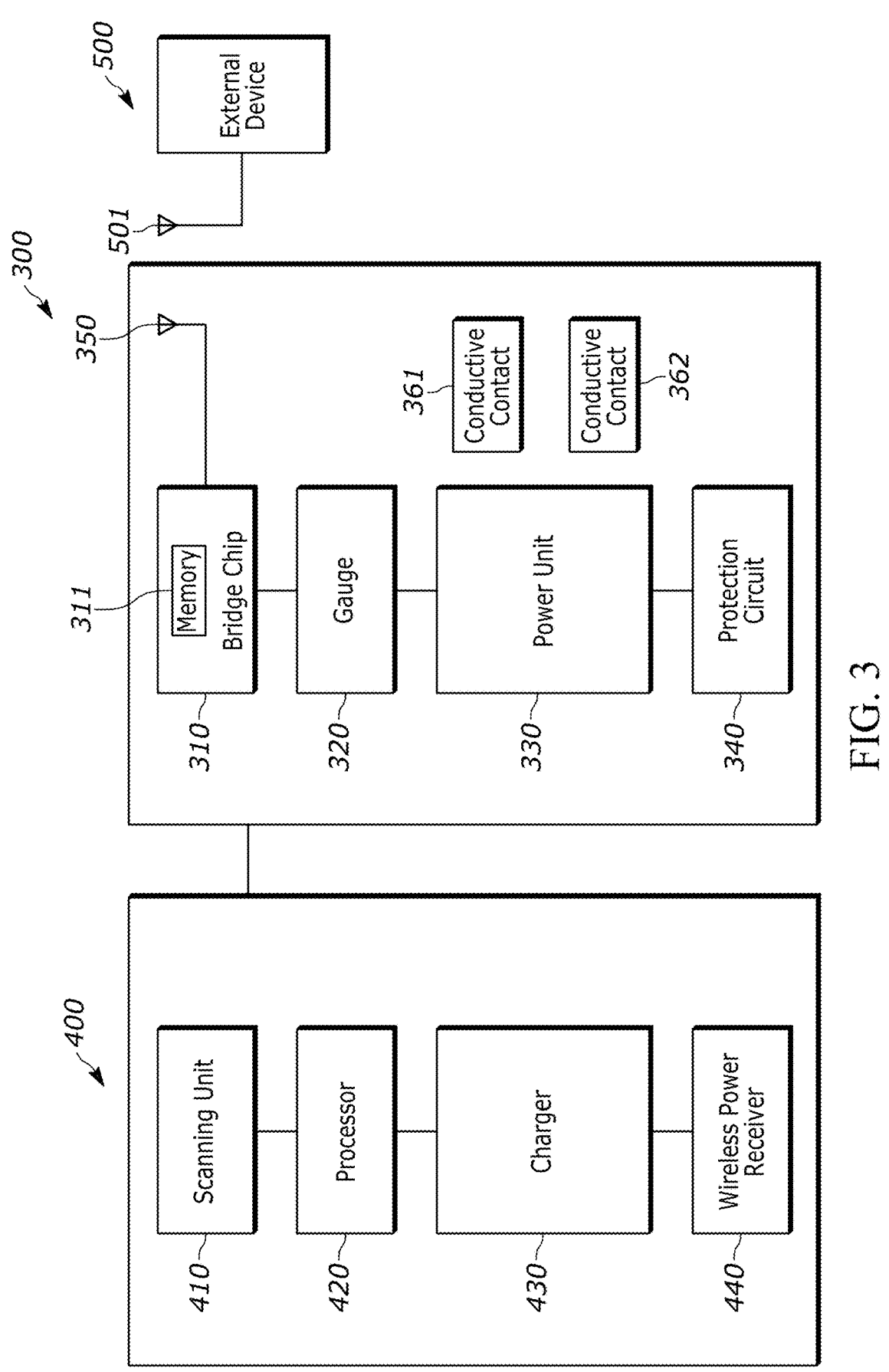
FIG. 3 is a diagram of a system having an energy storage device according to an embodiment of the present disclosure.

FIG. 3 illustrates a system having an energy storage device according to an embodiment of the present disclosure. The system includes an electronic device 400 and an energy storage device 300. The energy storage device 300 may include a bridge chip 310, a gauge 320, a power unit 330, a protection circuit 340, and an antenna 350. The bridge chip 310 may further include a memory 311. It should be understood that the energy storage device 300 may have same or similar configurations as the energy storage device 100 illustrated in FIG. 1. Thus, the details of the configurations of the energy storage device 300 are omitted here.

The electronic device 400 may be a scanner device such as a QR code scanner and/or a barcode scanner. For example, the electronic device 400 may include a scanning unit 410, a processor 420, a charger 430 and wireless power receiver 440 as illustrated in FIG. 3. The scanning unit 410 may include a light source, a lens and/or a light sensor translating optical impulses into electrical ones in an embodiment. The scanning unit 410 may include solid state or semiconductor lasers including diode lasers, and/or Charge Coupled Device (CCD) to scan or read the barcode and QR code. The processor 420 is provided to control the electronic device 400. For example, the processor 420 may include a microcontroller, a microprocessor, a CPU or the like to control the scanning unit 410, the charger 430 and the wireless power receiver 440. The charger 430 includes a charging circuit that is capable of charging a power unit. For example, when the energy storage device 300 is attached, inserted or electrically coupled to the electronic device 400, the charger 430 is configured to charge the power unit 330 of the energy storage device 300. The wireless power receiver 440 may include a receiver coil, a rectifier and an integrated circuitry according to an embodiment. The wireless power receiver 440 is configured to harvest energy from a wireless power generation station or source, and provides the power to the electronic device 400 or the charger 430 to charge the energy storage device 300. The electronic device 400 may further include a display unit or screen to display the information read out from the QR code or barcode.

According to an embodiment, the energy storage device 300 may include conductive contacts 361, 362 that are configured to receive a charge from a charging station or a charging device such as the electronic device 400. The conductive contacts 361, 362 may be one for positive polarity and one for negative polarity. The conductive contacts 361, 362 can be used to electrically and communicatively connect or couple with the electronic device 400. The energy storage device 300 can supply power to the electronic device 400 when it is physically attached or inserted to the electronic device 400. The energy storage device 300 may further include one or more additional conductive contacts to couple a communication bus line from the gauge 320 to a host device such as the electronic device 400.

In the case that the energy storage device 300 is electrically and/or communicatively connected with the electronic device 400 through the conductive contacts 361, 362, the electronic device 400 is configured to read out the information from the gauge 320 to monitor and/or examine the health and charge status of the power unit 330. To avoid potential interference or contention between the bridge chip 310 and the electronic device 400, the bridge chip 310 may be temporarily disabled in an embodiment. However, in another embodiment, the bridge chip 310 may still stay active and not be disabled for sending out the information of the power unit 330 when it is needed by the user.

In the case that the conductive contacts 361, 362 of the energy storage device 300 are broken or fail to electrically and/or communicatively connect with the electronic device 400, the energy storage device 300 can still be able to send out the information of the power unit 330 to an external device 500 through its antenna 350 per request. This provides great advantages to the energy storage device 300 in the present disclosure over the conventional ones that would not be able to provide the needed information when the conductive contacts 361, 362 are broken or not working.

The external device 500 as illustrated in FIG. 3 can be used to communicate with the system via its antenna 501. The external device 500, for example, may be a mobile phone, a tablet, a portable computer, a scanner or a reader/writer. The reader/writer may be industrial NFC reader/writers that are capable of programming NFC EEPROM enabled products in boxes at the same time in an embodiment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the devices and/or systems described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. The disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An energy storage device, comprising:
   a power unit;
   a gauge;
   at least one of an IC chip or a memory to hold information related to the power unit;
   an antenna; and
   a bridge electrically coupled to the antenna,
   wherein the bridge is configured to receive the information from the gauge and transmit the information through the antenna to an external device.

2. The energy storage device according to claim 1, wherein the bridge includes an Inter-Integrated Circuit to Near-Field Communication (NFC) chip.

3. The energy storage device according to claim 2, wherein the Inter-Integrated Circuit to Near-Field Communication (NFC) chip includes a non-volatile memory.

4. The energy storage device according to claim 1, wherein the antenna includes a coil configured to perform NFC transmission.

5. The energy storage device according to claim 1, wherein the power unit includes at least one of a battery or a supercapacitor.

6. The energy storage device according to claim 1, wherein the antenna is provided on a housing of the energy storage device.

7. The energy storage device according to claim 1, wherein the gauge is configured to store the information of the power unit.

8. The energy storage device according to claim 1, wherein the information from the gauge includes at least one of State of Charge (SoC), State of Health, cycle count, manufacture date, time in service, serial number, design capacity, voltage, current, protection status, firmware version, and temperature information associated with the power unit.

9. The energy storage device according to claim 1, further comprising a battery protection circuit.

10. The energy storage device according to claim 1, wherein the external device includes at least one of a mobile phone, a tablet, a portable computer, a scanner, or a reader/writer.

11. The energy storage device according to claim 1, wherein the bridge is configured to be powered by energy from the external device through the antenna.

12. The energy storage device according to claim 1, wherein the bridge is configured to be powered by the power unit.

13. The energy storage device according to claim 1, further comprising conductive contacts configured to receive a charge from a charging station and deliver the charge to an electronic device.

14. The energy storage device according to claim 13, wherein the electronic device includes at least one of a QR code scanner and a barcode scanner.

\* \* \* \* \*